(12) United States Patent
Matsunaga

(10) Patent No.: US 11,894,542 B2
(45) Date of Patent: Feb. 6, 2024

(54) METHOD FOR MANUFACTURING ALL-SOLID-STATE BATTERY

(71) Applicant: MTEK-SMART CORPORATION, Yokohama (JP)

(72) Inventor: Masafumi Matsunaga, Yokohama (JP)

(73) Assignee: MTEK-SMART CORPORATION, Yokohama (JP)

( * ) Notice: Subject to any disclaimer, the term of this patent is extended or adjusted under 35 U.S.C. 154(b) by 0 days.

(21) Appl. No.: 17/269,716

(22) PCT Filed: Aug. 13, 2019

(86) PCT No.: PCT/JP2019/031841
§ 371 (c)(1),
(2) Date: Feb. 19, 2021

(87) PCT Pub. No.: WO2020/039999
PCT Pub. Date: Feb. 27, 2020

(65) Prior Publication Data

US 2021/0242444 A1 Aug. 5, 2021
US 2021/0384484 A2 Dec. 9, 2021

(30) Foreign Application Priority Data

Aug. 21, 2018 (JP) .................................. 2018-154552

(51) Int. Cl.
*H01M 4/04* (2006.01)
*H01M 10/052* (2010.01)
(Continued)

(52) U.S. Cl.
CPC ....... *H01M 4/0419* (2013.01); *H01M 4/0404* (2013.01); *H01M 4/0409* (2013.01);
(Continued)

(58) Field of Classification Search
CPC ............. H01M 4/0404; H01M 4/0409; H01M 4/0411; H01M 4/0414; H01M 4/0419;
(Continued)

(56) References Cited

U.S. PATENT DOCUMENTS 7,871,502 B2* 1/2011 Aoki ................... H01L 31/0322
204/192.26
2005/0233066 A1 10/2005 Sunagawa et al.
(Continued)

FOREIGN PATENT DOCUMENTS

JP 5-109429 A 4/1993
JP 2005-310502 A 11/2005
(Continued)

OTHER PUBLICATIONS

International Search Report dated Nov. 26, 2019 of corresponding International Application No. PCT/JP2019/031841; 5 pgs.

*Primary Examiner* — Brian K Talbot
(74) *Attorney, Agent, or Firm* — Maier & Maier, PLLC

(57) ABSTRACT

To lower electrical resistance by increasing the interfacial surface area and the adhesion between a current collector and an active material or an electrolyte, or between the active material and the electrolyte in an all-solid-state battery. In addition, to improve battery performance by eliminating or minimizing residual carbon originating from a binder. A slurry, composed of an electrode active material and a solvent, and a slurry, composed of electrolyte particles and a solvent, can be impacted against a target and thereby attached thereto to form a high-density layer and improve adhesion. Moreover, residual carbon is eliminated or minimized by eliminating or minimizing the content of binders, thereby improving battery performance.

9 Claims, 4 Drawing Sheets

(51) Int. Cl.

| | | |
|---|---|---|
| B05D 1/12 | (2006.01) | |
| H01M 10/0562 | (2010.01) | |
| B05D 5/12 | (2006.01) | |
| B05D 1/04 | (2006.01) | |
| B05D 1/02 | (2006.01) | |
| C23C 24/04 | (2006.01) | |
| H01M 4/36 | (2006.01) | |
| B05D 1/06 | (2006.01) | |

(52) U.S. Cl.
CPC ....... H01M 4/0411 (2013.01); H01M 4/0414 (2013.01); H01M 10/052 (2013.01); B05D 1/02 (2013.01); B05D 1/04 (2013.01); B05D 1/06 (2013.01); B05D 1/12 (2013.01); B05D 5/12 (2013.01); C23C 24/04 (2013.01); H01M 4/36 (2013.01); H01M 10/0562 (2013.01)

(58) Field of Classification Search
CPC .. H01M 4/36; H01M 10/052; H01M 10/0562; H01M 10/585; B05D 1/02; B05D 1/04; B05D 1/06; B05D 1/12; B05D 5/12; C23C 24/04
USPC .......................................................... 427/115
See application file for complete search history.

(56) References Cited

U.S. PATENT DOCUMENTS

| | | | | |
|---|---|---|---|---|
| 2005/0233090 | A1* | 10/2005 | Tapphorn | C23C 24/04 427/532 |
| 2006/0093888 | A1* | 5/2006 | Vyas | C23C 24/04 429/518 |
| 2006/0159997 | A1* | 7/2006 | Sunagawa | H01M 4/661 429/233 |
| 2007/0209584 | A1* | 9/2007 | Kalynushkin | H01G 11/22 118/311 |
| 2008/0248358 | A1* | 10/2008 | Miyazaki | H01M 8/04291 429/535 |
| 2009/0325063 | A1* | 12/2009 | Albano | H01M 4/0421 429/188 |
| 2010/0159350 | A1* | 6/2010 | Kurita | H01M 4/886 429/483 |
| 2011/0143018 | A1* | 6/2011 | Peng | H01M 10/052 427/78 |
| 2012/0064225 | A1* | 3/2012 | Bachrach | H01M 4/0419 118/313 |
| 2013/0040206 | A1 | 2/2013 | Yoshida et al. | |
| 2013/0209873 | A1 | 8/2013 | Nagasaka et al. | |
| 2015/0311504 | A1* | 10/2015 | Hong | H01M 4/133 429/231.95 |
| 2016/0074903 | A1 | 3/2016 | Matsunaga | |
| 2017/0098818 | A1* | 4/2017 | Cheng | H01M 4/662 |
| 2017/0283933 | A1* | 10/2017 | Ibe | C23C 4/12 |
| 2018/0138494 | A1* | 5/2018 | Birt | H01M 4/1397 |
| 2019/0288277 | A1 | 9/2019 | Michibata et al. | |
| 2019/0296335 | A1* | 9/2019 | Yao | H01M 4/485 |

FOREIGN PATENT DOCUMENTS

| | | |
|---|---|---|
| JP | 2014-212022 A | 11/2014 |
| JP | 2017-168435 A | 9/2017 |
| JP | 2018-101580 A | 6/2018 |
| JP | 2018-125247 A | 8/2018 |
| WO | 2011/105574 A1 | 9/2011 |
| WO | 2012/053359 A | 4/2012 |
| WO | 2014/171535 A1 | 10/2014 |
| WO | 2016/158859 A1 | 10/2016 |

* cited by examiner

METHOD FOR MANUFACTURING ALL-SOLID-STATE BATTERY

FIELD

The present invention relates to a method for manufacturing an all-solid-state battery being a laminated structure including a positive electrode layer, an electrolyte layer, and a negative electrode layer, which includes:
preparing a slurry containing particles including active materials;
forming both of the electrode layers;
preparing a slurry containing electrolyte particles;
forming the electrolyte layer.

BACKGROUND

As mobiles and electric vehicles increase, there is a need for quick charging of secondary batteries including lithium batteries, but tens of minutes are required for filling in electric vehicles. Because of the length of time, safety risks and the like, development to change electrolyte from liquid to solid is underway to reduce 80% filling time to a few minutes.

Patent Document 1 proposes a method for manufacturing an all-solid-state battery being a layered structure including a solid electrolyte layer, a positive electrode active material layer, and a negative electrode active material layer, and introduces a technology for forming electrodes, including: preparing a slurry containing materials for constituting the layered structure; forming a green sheet; forming integrally the green sheet and a sheet having asperities that disappears when heated; forming the asperities on the surface of the green sheet; heating the integrally formed green sheet and the sheet to disappear the sheet material, and firing the green sheet to form asperities on base material.

Patent Document 2 proposes a polyvinyl acetal resin for an electrode slurry containing active material particles, solvent and binder and for an electrolyte slurry containing electrolyte particles, solvent and binder, to form electrode layers and electrolyte layers for an all solid state battery and for laminating them, which can be debindered in a short time at low temperature. More specifically, a solid electrolyte slurry and a negative or positive electrode slurry are applied on a support layer of mold-release treated PET film, the PET film is peeled off after drying at 80° C. for 30 minutes, the electrolyte layer is sandwiched between the negative and positive electrode active material layers and then heated and pressurized at 80° C. and 10 kN to obtain a laminated structure, and conductive paste containing acrylic resin is applied on a stainless steel plate to make a current collector, and it is fired at 400° C. or lower under a nitrogen gas atmosphere to debinder the binder.

In the method disclosed in Patent Document 1, the active material slurry and electrolyte slurry are applied to a sheet of polyvinyl alcohol or the like with asperities, which is ideal because of the increased contact area of the active material and electrolyte layers, but the resin content needs to be disappeared at high temperatures for a long time, for example, 50 hours at 700° C. Patent Document 2 has a problem that volatilizing the solvent in the slurry takes 30 minutes at 80° C., so manufacturing lines for lithium-ion batteries would have to be much longer in order to maintain the current line speed of 100 m/min, or the line speed would have to be reduced. In both methods, when the binder in the slurry is eliminated or reduced, particle precipitation occurs at points where the slurry tended to stagnate in the general circulation system, and the application could not be performed with a die head used for electrode formation in lithium batteries.

RELATED ART DOCUMENTS

Patent Documents

Patent document 1: WO2012/053359A
Patent document 2: JP2014-212022A

SUMMARY OF THE INVENTION

The purpose of the present invention is to improves productivity, to eliminate or minimize residual carbon generated during firing in a laminated structure that requires the firing, to improve adhesiveness of interface between the layers, and to widen the surface area of the interface between the electrode layer and electrolyte layer to lower the interfacial resistance and improve the battery performance. In the present invention, various types of sulfides and oxides can be used for solid electrolyte particles. Various types of positive and negative active material particles can also be used. For example, if the electrolyte is sulfide, such as LPS, the positive electrode may be lithium sulfur ($Li_2S$) particles or sulfur ($S_8$), and the negative electrode may be graphite and silicon particles.

Means of Solving the Problems

The purpose of the present invention is to solve the aforementioned problems, and to convert the slurry containing the particles and solvent, or the particles, solvent, and binder as a binding agent between the particles into particles by a spray or particle generator, to impact the particles on an object with impact at the desired speed, and to adhere the particles to the object in a dense and strong manner after evaporation of the solvent in order to produce a high-quality all-solid-state battery. The object includes the positive electrode layer, the negative electrode layer, the electrolyte layer, and the current collector. In the case of attaching the electrode slurry particles, the object is the current collector or the electrolyte layer. In the case of attaching the electrolyte slurry particles, the object is mainly the positive and negative electrode layers. It also includes attaching the electrolyte particles to the current collector together with the positive or negative electrode active materials and the like to make an electrode.

The present invention provides a method for manufacturing an all-solid-state battery by laminating an electrode layer and an electrolyte layer for the all-solid-state battery, comprising forming interface formation between the electrode layer and the electrolyte layer by splaying an electrode slurry containing active material particles or a solvent and an electrode slurry containing electrolyte particles and a solvent, with impact.

The present invention provides a method for manufacturing an all-solid-state battery by forming an electrode by applying an electrode slurry to a current collector, comprising splaying a slurry containing active material particles and a solvent and a slurry containing electrolyte particles and a solvent to a current collector alternately with impact to laminate each slurry over and overt.

The present invention provides the method, in which the electrode slurry or the electrolyte slurry is converted into particles by a particle generator or a fine particle generator, and the particles or groups of particles are transferred, impacted and adhere with a pressure difference to an object being at least one selected from the group consisting of the current collector, the electrode layer, and the electrolyte layer.

The present invention provides the method, in which the electrode slurry or the electrolyte slurry contains a binder.

The present invention provides the method, in which the surface of the active material particles or electrolyte particles is coated with a thin film of the binder in advance, and the solvent in the slurry is a poor solvent in relation to the binder.

The present invention provides the method, in which in order to convert the electrode slurry or the electrolyte slurry or to transfer into fine particles and to adhere the fine particles to the object, the object is heated, and at least 95 percent of the solvent is volatilized within two seconds after the fine particles are adhered.

The present invention provides the method of any one of claims 1 to 7, wherein the splay or particle movement is done in pulses of 1 to 1000 Hz (Hertz).

In the present invention, the amount of the binder in each slurry is preferably 10% or less of the total solid content by weight, especially when firing is performed in a subsequent process, and preferably 2% or less for reasons such as minimizing residual carbon. It is possible to create an electric potential difference between the target object and slurry or fine particles made by spraying, and to support the adhesion of the fine particles electrostatically. It is particularly effective for the adhesion of ultra-fine particles having sub-micron size or smaller. In order to electrostatically charge the sprayed particles, the binder or solvent as described above should be selected to be easily charged by the static electricity.

According to the method for manufacturing the all-solid-state battery, splayed particles and the like are impacted and attached to the object with impact, so it is possible to form ultra-dense particle groups. In addition, the interface of the electrode can be easily formed with fine asperities or asperities having the desired size if necessary, so that the contact area with the electrolyte layer can be increased and an anchor effect can be used to improve adhesion and lower the interface resistance maximally.

In addition, a laminated structure can be formed to laminate the positive electrode layer, electrolyte layer, and negative electrode layer, all of which can be formed from particles made by spraying the slurry for electrodes and electrolytes, according to the present invention. On the other hand, the positive electrode layer, electrolyte layer, negative electrode layer can be prepared by die-coating, roll-coating, curtain-coating, screen-coating, or the like, which can speed up the process, and it is also possible to form the laminated structure by particulating and then attaching the desired slurry, solvent, or binder solution with low solid content in an impact manner to the interface with the positive electrode layer, electrolyte layer, negative electrode layer or current collector only.

Furthermore, the present invention is not limited to a single slurry containing multiple types of particles, especially for electrodes, but various slurries can be made and the corresponding heads can be used. For example, when electrode particles and electrolyte particles which have different specific weights and particle diameters each other can be mixed to make a slurry without binder or with a small amount of binder, particles with a heavier specific gravity will settle down over time or instantaneously no matter how uniformly the slurry is mixed, and dispersion state will change. An ideal laminated structure for the electrodes can be obtained by preparing a slurry containing the electrode particles, and a slurry containing the electrolyte particles, setting the amount of spray at the desired ratio for each, and laminating each slurry over and over in a thin film in the desired overlapping, for example, alternating layers. This method is also effective for laminating the desired distribution of the conductive agents such as carbon particles and carbon nanofibers and the active materials with different specific gravity and particle size, which differ greatly in their ratio per volume. Too little or much of the conductive agent per unit volume of the electrode layer will affect the performance, so it is far better than applying it as a slurry mixed with the active material.

In particular, if a slurry with a lower solid concentration (e.g., 10% or less) derived from the conductive agent is made into a thin film and laminated over and over so as to get entangled on the active material particles, the amount of the application per unit area becomes more uniform, leading to improved battery performance.

Furthermore, in the present invention, an adhesive or gluing agent that has strong adhesive strength and can withstand expansion and contraction can be partially applied to silicon particles to prevent performance degradation due to expansion and contraction of silicon particles, which are effective for the negative electrode. In other words, a slurry containing the silicon particles and solution or emulsion of the strong adhesive can be made into particles by separate heads and laminated to form an electrode layer by partially attaching them to the silicon particle surface as adhesive particles. In particular, a pulsed method with impact is the best way to splay the adhesive or change it into fine particles to transfer and partially or fully adhere to the silicon particle surface. It is also possible to add carbon particles to the adhesive solution or emulsion of the adhesive to make a slurry for the application.

The object can also be heated. The heating temperature is preferably between 30 and 150° C. By heating the object, the solvent content in the particulate slurry can be evaporated at the same time as it contacts with and wets the object. The time required to evaporate 95% of the solvent is preferably within 2 seconds, ideally within 1 second. When the time is longer than 2 seconds, the group of high-density particles deposited by the impact tends to be loosened by the solvent. Also, if evaporation occurs instantly upon the impact, solvent vapor can easily scatter the spray particles and cause the binder to boil.

In the present invention, when the slurry is converted into particles by the splaying and adhered to the object in a pulsed manner, the impact can increase. In particular, in the air spray method, which is known in the industry as a two-fluid spray, the mass of the air surrounding the sprayed particles is 400 to 600 times greater than usual, so particles arriving later on the object are pushed back by the rebounding air on the object, resulting in loss of impact and extremely poor particle adhesion efficiency. On the other hand, in the impact pulse method in which both slurry and air are applied in a pulsed manner, compressed air between a spray particle cluster and another spray particle cluster diffuses, and only the directional particles move and adhere. As a result, it is also economical because of an adhesion efficiency of more than 95%, compared to about 30-50% for ordinary sprays. By using the pulsed spraying, for example, the amount of the conductive agent to be applied can be reduced to less than one-tenth of that of normal spraying when adjusting the ratio of the active material, which is extremely convenient.

As described above, the present invention can be used to produce an all-solid-state battery with high performance.

DETAILED DESCRIPTION

Now, a preferred embodiment of the present invention will be described with reference to the drawings. However, the embodiment below is only an example for facilitating the understanding of the present invention. Addition, replacement, deformation, or the like executable by those skilled in the art can be made thereto without departing from the technical idea of the present invention.

The drawings schematically show the preferred embodiment of the present invention.

Figure 1:
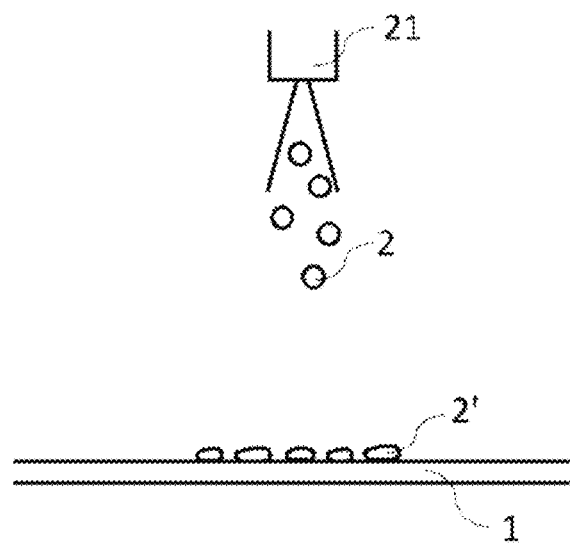
FIG. 1 shows a schematic diagram for active materials being splayed on an object (current collector), according to the present embodiment.

In FIG. 1, a slurry containing electrode active material particles and a solvent or a slurry containing active material particles, a solvent and a binder is sprayed from a spray head 21 onto a current collector 1 as an object, resulting that active material spray particles 2 are attached to the current collector 1, and then active material particles 2' are made. The active material particles 2' may be particles of the active material coated with the electrolyte material. Adhesion can be improved by pulsed spraying and attaching the spray particles to the current collector with impact at a high speed. The impact on the sprayed particles 2 is can be archived by keeping the distance between the object and the spray head close, e.g., 70 mm or less, and by pulsed splaying at a gas pressure of 0.15 to 0.3 MPa using a two-fluid nozzle with a splay pattern of a narrow splay angle, e.g., at 30 degrees or less. The number of pulses per second is preferably 10 Hz or higher for productivity. The shorter the distance and the narrower the splay pattern angle, the higher the impact.

Figure 2:
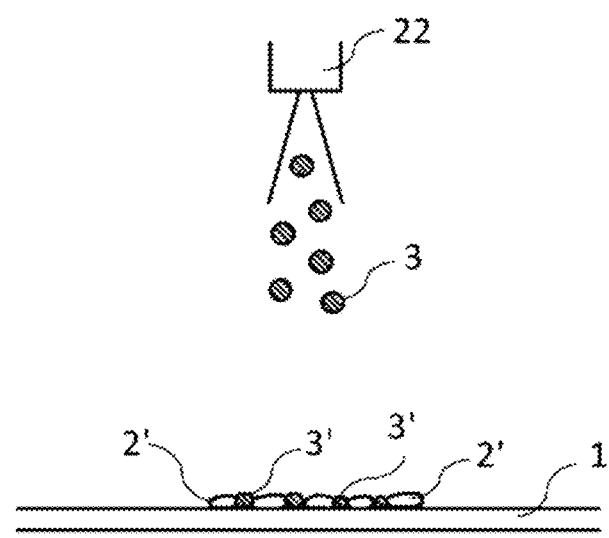
FIG. 2 shows a schematic diagram for different (e.g., conductive agent) particles being splayed onto the active material particles attached on the object, according to the present embodiment.

FIG. 2 shows dispersed coating in a thin film by splaying a slurry (containing, e.g., electrolyte particles) different from that of FIG. 1 around and on top of the thin film (e.g., made of active material particles 2') with a head 22. The splay of the active material from the head 21 in FIG. 1 and the splay of the electrolyte from the head 22 may be alternated to build up many layers in a thin film. Instead of the electrolyte particles, a solution or slurry including a conductive agent such as lithium iodide or at least one conductive agent selected from the group consisting of carbon particles, carbon fibers and carbon nanotubes, or a slurry of the mixture of them with the active material for the electrodes or the electrolyte particles is sprayed from the spray head 22 and then the sprayed particles 3 are adhered. Pore carbon and nanocarbon with large surface area, which is the conductive agent, are excellent. For example, when it has 2,000 square meters per gram or more in BET plot, and preferably 3,500 square meters or more, the electrode performance can be improved by encapsulating the sulfur or the active materials in the positive electrode and nano-level silicon in the negative electrode, in the nano-level pores in advance.

Figure 3:
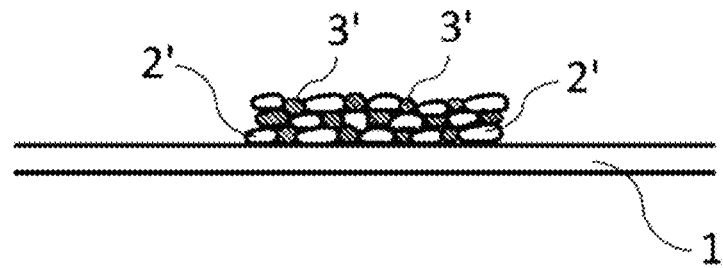
FIG. 3 shows a schematic cross-sectional view of two types of particles laminated together, according to the present embodiment.

In FIG. 3, the electrode active material particles 2' and electrolyte particles 3' are laminated alternately. Weight ratio per unit area of each can be freely selected, and the ratio can be easily adjusted by especially performing pulsed spraying. Furthermore, a different spray head can be used to disperse and apply the desired amount of conductive agent around the electrode active material to achieve the adhesion.

Figure 4:
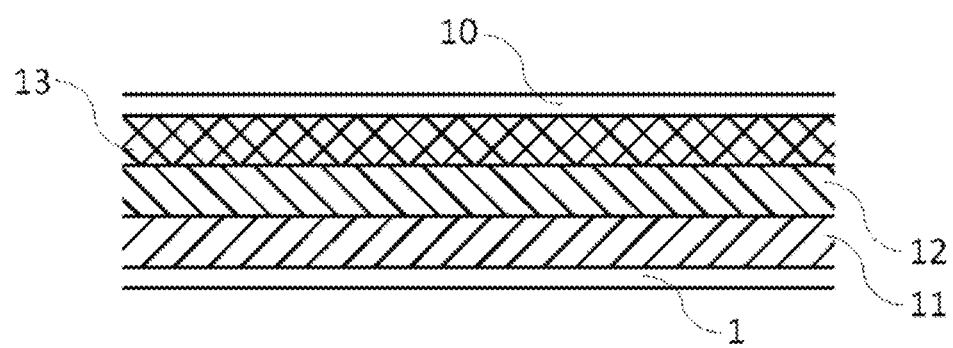
FIG. 4 shows a schematic cross-sectional view of a current collector, positive electrode layer, electrolyte layer, negative electrode layer, and current collector laminated together, according to the present embodiment.

In FIG. 4, a positive electrode layer 11 and a negative electrode layer 13 are laminated on both sides of an electrolyte layer 12, and the electrodes 11 and 13 are sandwiched between the current collectors 1 and 10. A laminated structure for the all-solid-state battery is completed by pressing it under heated condition or at room temperature. As the current collector, aluminum foil and copper foil are generally used for the positive electrode and the negative electrode, respectively, but not limited thereto, stainless steel sheet may be used depending on the types of the active material and electrolyte.

Figure 5:
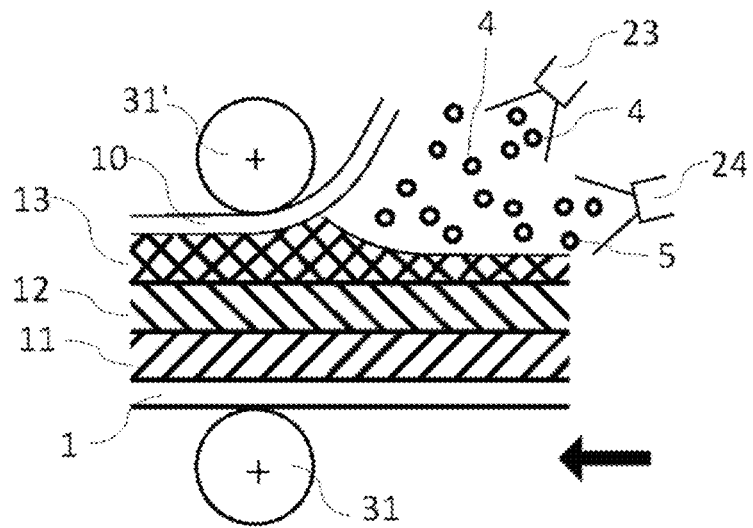
FIG. 5 shows a schematic cross-sectional view of electrode slurries being splayed onto the objects (current collector and electrolyte layer), according to the present embodiment.

In FIG. 5, an electrolyte slurry and a negative electrode active material slurry are alternately sprayed from the spray heads 24 and 23, respectively, to form the negative electrode layer on the positive electrode current collector 1, the positive electrode layer 11, the electrolyte layer 12 and on the negative electrode current collector, and then pressing is performed using rolls 31 and 31'. When this pressing is performed in the subsequent process, the pressing pressure can be almost none or low. The rolls may be heated, and the current collector, electrode layer, and electrolyte layer may also be heated in advance to promote the volatilization of the solvent contained in the sprayed particles 4 and 5.

Figure 6:
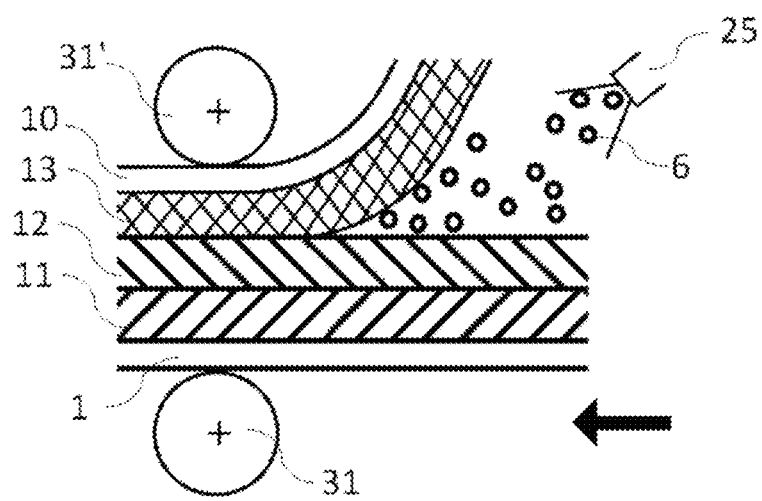
FIG. 6 shows a schematic cross-sectional view of the splay on the objects (electrolyte layer and electrode layer), according to the present embodiment.

In FIG. 6, the electrolyte or an electrode active material slurry is sprayed to the interface between the electrolyte membrane layer 12 and the negative electrode layer 13 with a spray head 25. It is possible to increase adhesive strength of the interface by spraying the solvent or the like to instantly swell the binder or the like at the respective interface. It is moved by the rolls 31 and 31' with or without the pressing pressure. There is no limit to the load, diameter, or number of press rolls.

Figure 7:
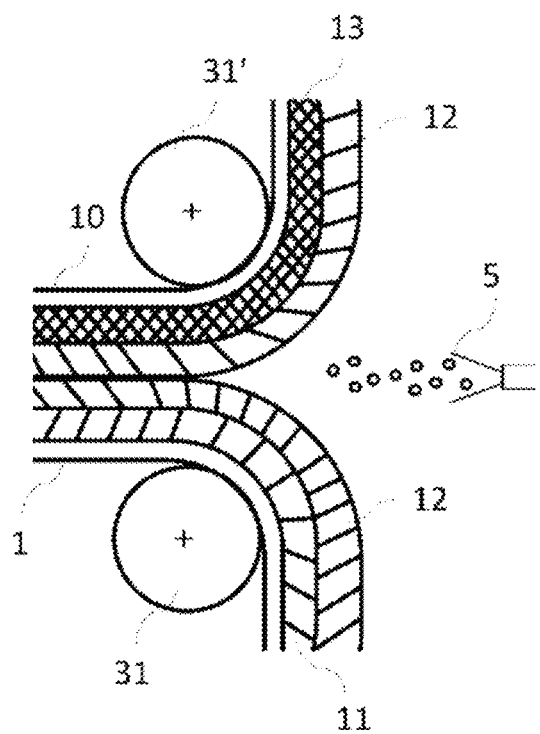
FIG. 7 shows a schematic cross-sectional view of the splay on the object (electrolyte layer), according to the present embodiment.

In FIG. 7, the slurry for the electrolyte layer or the solvent is sprayed onto the electrolyte layers formed on both the positive and negative electrode layers on flexible current collectors. The effect is as described above.

Figure 8:
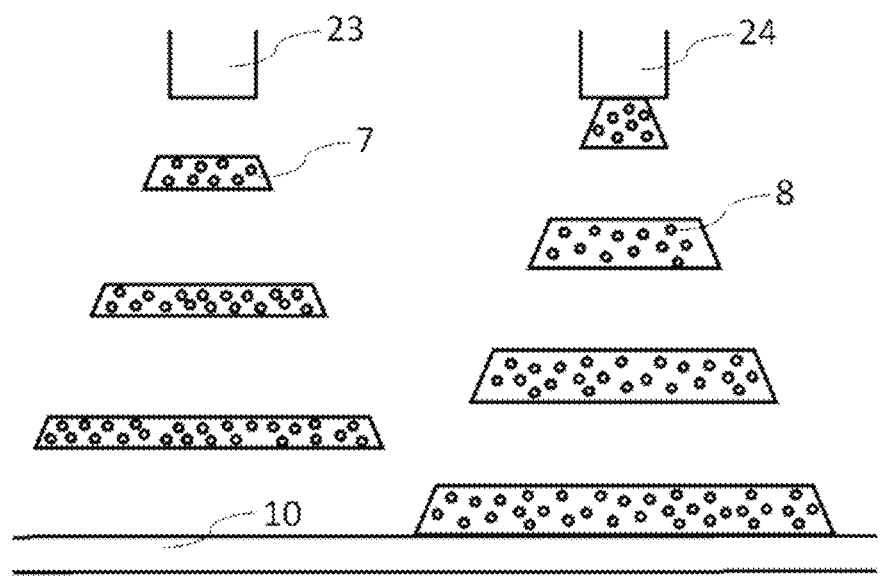
FIG. 8 shows a schematic cross-sectional view of the lamination by the alternated splaying of different materials onto the object (current collector) in a pulsed manner and with a time difference, according to the present embodiment.

In FIG. 8, the negative electrode active material slurry is sprayed onto the negative electrode current collector 10 from the spray head 23 in a pulsed manner to form sprayed particle clusters 7. On the other hand, the electrolyte slurry is pulsed sprayed from the spray head 24 to form sprayed particle clusters 8, and each sprayed particle cluster is alternately laminated on the negative electrode current collector. Preferably, it is thin and multi-layered. Similarly, the positive electrode active material slurry and the electrolyte slurry can be alternately laminated on the positive electrode current collector. Furthermore, an additional head, not shown in the figure, can be used to splay a small amount of conductive agent slurry in a pulsed manner alternately from the head 23 or 24.

In the embodiment, a head group including 100 to 200 spray heads arranged in one or more rows orthogonal to the direction of movement of an object with a width of, for example, 1500 mm can spray with impact in order to increase the productivity. If necessary, the head group can be moved back and forth (swung) in the head arrangement direction by, for example, 15 mm to sufficiently lap a pattern of, for example, 15 mm. The heads can be arranged for the required type of the slurry and for the desired number of laminations to meet the required speed.

The structure of the head can be simplified by using a wide roll with grooves, for example, every 10 millimeters in the width direction (disclosed in JPH08-309269A, of which inventor is the same as the present inventor). By rotating this roll with the grooves filled with the slurry, the slurry is be converted into particles by compressed gas, which can be adhered to the object. The speed of the object can theoretically be 100 meters per minute or more. Preferably, the number of roll devices to be placed orthogonal to the direction of movement of the object is determined according to the type of the slurry and the number of laminations. The technology disclosed by JPH06-86956A of which inventor is the same as the present inventor can also be used. A cylindrical screen or seamless belt with a width wider than the width of the object, equipped with numerous through holes (e.g., 150 micrometer diameter holes) filled with the slurry, may be used. When this cylindrical screen or seamless belt faces the object, the slurry is converted into fine particles to spray them by liquefied or compressed gas and evenly adhere to the entire surface of the object. Instead, a commercially available rotary screen for screen printing can be used to reduce the cost. The same effect can also be obtained by using a cylindrical pipe wider than the object, for example, with staggered holes of about 0.3 mm or 0.5 mm in diameter with a pitch of 1.5 mm. For the above two methods, the distance between the object and the location where the particles are blown out should be 70 millimeters or less to improve the impact effect. In the above two methods which also double as a volumetric feeding method, the line can be followed by changing the rotation speed, so there is no need for expensive pumps or controllers, and in the roll-to-roll process of a roll coater or rotary screen printer, equipment can be placed or manufacturing can be performed.

The slurry may be converted into particles and moved by pressure difference, and the particling may be done by inkjet. It can also be converted into particles by a disc or bell rotating atomizer used in the general coating field. Other methods such as atomization with a bubbler or ultrasonic waves and further refinement by hitting a rotating roll at close range with a spray stream are also acceptable. A particle group converted into particles may be transferred by carrier gas and attached to the object by differential pressure. The movement may be done in pulses to increase the adhesion efficiency and impact.

INDUSTRIAL APPLICABILITY

According to this embodiment, an all-solid-state battery with low interfacial resistance and high adhesiveness, which has a laminated structure including electrolyte, electrodes, and current collectors, can be manufactured with high quality.

DESCRIPTION OF THE REFERENCE NUMERAL

1 Positive electrode collector
2, 4 Sprayed particle of electrode active material
2' Electrode active material
3, 5 Sprayed particles of electrolyte
3' Electrolyte particles
6 Sprayed particles of solvent
7 Sprayed particle cluster of electrode active material
8 Sprayed particle cluster of electrolyte
10 Negative electrode collector
11 Positive electrode layer
12 Electrolyte layer
13 Negative electrode layer
21, 22, 23, 24, 25 Spray head
31, 31' Roll

What is claimed is:

1. A method for manufacturing a storage battery, comprising:
    pulsed-spraying different electrode slurries at a gas pressure of 0.15 to 0.3 MPa on an object by independent heads to laminate each electrode slurry in order to form a positive or negative electrode on the object, wherein a distance between the object and each head is 70 mm or less, an angle of each head to the object is 30 degrees or less, a number of pulses per second is 10 Hz or higher, a base material is heated to between 30 and 150° C. when the different electrode slurries are pulsed-sprayed, each of the different electrode slurries contains a binder, and an amount of the binder in each electrode slurry is 2% or less of a total solid content by weight.

2. The method of claim 1, wherein at least one of the different electrode slurries is a slurry containing different particles.

3. The method of claim 1, wherein at least two of the different electrode slurries are a slurry containing an active material, and a slurry containing a conductive agent.

4. The method of claim 1, wherein at least one of the independent heads converts the slurries filled into
    (i) holes of a perforated cylindrical body or a perforated seamless belt that rotates in a direction of movement of the object, or
    (ii) a plurality of grooves formed in a rotatable wide roll.

5. The method of claim 1, wherein at least one of the electrode slurries is pulsed sprayed and laminated by the independent heads arranged in a direction of movement of the object, and the number of independent heads is the same as the number of layers of the slurry.

6. The method of claim 1, wherein the storage battery is an all-solid-state battery, and any of the different electrode slurries contains active material particles, electrolyte particles, and a conductive agent.

7. The method of claim 1, wherein only an interface with the object is applied by spraying or applied by a particle generator.

8. The method of claim 7, wherein applying a thin film is performed over and over by the spraying or applied by a particle generator.

9. The method of claim 1, wherein the storage battery is an all-solid-state battery, the object is a current collector, and the pulsed-spraying different electrode slurries is pulsed-spraying a slurry containing active material particles and a solvent and a slurry containing electrolyte particles and the solvent alternately to laminate each slurry over and over on the current collector.

\* \* \* \* \*